(12) United States Patent
Ito et al.

(10) Patent No.: US 8,734,955 B2
(45) Date of Patent: May 27, 2014

(54) TRANSPARENT LAMINATE AND PROCESS FOR PRODUCING THE SAME

(75) Inventors: Hiroshige Ito, Chiyoda-ku (JP); Satoshi Niiyama, Chiyoda-ku (JP); Satoshi Kikuchi, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/616,225

(22) Filed: Sep. 14, 2012

(65) Prior Publication Data

US 2013/0004735 A1    Jan. 3, 2013

Related U.S. Application Data

(63) Continuation of application No. 12/490,407, filed on Jun. 24, 2009, which is a continuation of application No. PCT/JP2007/075017, filed on Dec. 26, 2007.

(30) Foreign Application Priority Data

Dec. 28, 2006    (JP) .................................. 2006-354969

(51) Int. Cl.
*B32B 17/10*    (2006.01)
*B32B 7/12*    (2006.01)

(52) U.S. Cl.
USPC ............ 428/442; 428/436; 428/437; 428/441

(58) Field of Classification Search
USPC ................... 428/436, 437, 441, 442
See application file for complete search history.

(56) References Cited

U.S. PATENT DOCUMENTS

| 4,599,274 | A | 7/1986 | Ando et al. | 428/442 |
| 4,724,023 | A | 2/1988 | Marriott | 156/102 |
| 4,969,966 | A | 11/1990 | Norman | 156/102 |
| 8,310,649 | B2 | 11/2012 | Niiyama et al. | 349/187 |
| 2007/0228341 | A1* | 10/2007 | Hayes et al. | 252/587 |
| 2011/0132518 | A1 | 6/2011 | Ito | 156/60 |
| 2012/0107995 | A1 | 5/2012 | Niiyama et al. | 438/64 |
| 2012/0211080 | A1 | 8/2012 | Niiyama et al. | 136/259 |

FOREIGN PATENT DOCUMENTS

| DE | 31 15 211 A1 | 12/1982 |
| DE | 198 36 695 A1 | 2/2000 |
| JP | 63-100045 | 5/1988 |
| JP | 03-65542 | 3/1991 |

(Continued)

OTHER PUBLICATIONS

Machine Translation of JP 2003222909 A to Aizawa, Aug. 8, 2003.*

(Continued)

*Primary Examiner* — D. S. Nakarani
(74) *Attorney, Agent, or Firm* — Oblon, Spivak, McClelland, Maier & Neustadt, L.L.P.

(57) ABSTRACT

A transparent laminate is produced by preparing a pair of transparent substrates, forming a sealing portion along the periphery on one of the transparent substrates for sealing a curable resin composition, supplying the curable resin composition in a region on the transparent substrate surrounded by the sealing portion, overlaying the other transparent substrate on the supplied curable resin composition in a reduced pressure atmosphere so that the curable resin composition is sealed as it is sandwiched between the pair of transparent substrates, and subsequently curing the curable resin composition in an atmosphere having a higher pressure than the pressure of the atmosphere in which the composition is sandwiched, to produce the transparent laminate.

17 Claims, 5 Drawing Sheets

(56) References Cited

FOREIGN PATENT DOCUMENTS

| JP | 06-071833 | 3/1994 |
|---|---|---|
| JP | 2003-212614 | 7/2003 |
| JP | 2003-222909 | 8/2003 |
| JP | 2005-041747 | 2/2005 |
| WO | 01/38087 A1 | 5/2001 |

OTHER PUBLICATIONS

U.S. Appl. No. 13/626,172, filed Sep. 25, 2012, Niiyama, et al.
U.S. Appl. No. 13/613,686, filed Sep. 13, 2012, Niiyama, et al.
U.S. Appl. No. 13/646,903, filed Oct. 8, 2012, Niiyama, et al.
Extended European Search Report issued Jan. 20, 2011, in Application No. / Patent No. 07860246.3-2124 / 2100725 PCT/JP2007075017.
Editors: Victoria Neufeldt & David B. Guralnik, Webster's New World Dictionary of American English, Third College Edition, pp. 301 & 302, Copyright 1988 by Simon and Schuster, Inc.
Office Action issued May 23, 2013, in Japan Patent Application No. 2012-219984 (with Englishlanguage Translation).
U.S. Appl. No. 13/949,424, filed Jul. 24, 2013, Niiyama, et al.

\* cited by examiner

TRANSPARENT LAMINATE AND PROCESS FOR PRODUCING THE SAME

CROSS REFERENCE TO RELATED APPLICATION

This application is a continuation of U.S. application Ser. No. 12/490,407, filed on Jun. 24, 2009, which is a 371 of PCT/JP07/075,017, filed on Dec. 26, 2007, and claims priority to Japanese Patent Application No. 2006-354969, filed on Dec. 28, 2006.

TECHNICAL FIELD

The present invention relates to a transparent laminate such as a laminated glass to be used for a window glass for buildings or vehicles, comprising two glass substrates and a resin interlayer formed between the glass substrates; and a process for producing such a transparent laminate.

BACKGROUND ART

A transparent laminate is known, which is produced by laminating a pair of transparent substrates via a thermoplastic resin film of e.g. polyvinyl butyral (PVB) or a thermocrosslinkable transparent resin film while the transparent substrates are heated and pressurized by an autoclave, and when the transparent substrates are glass substrates, the laminate is known by the name of laminated glass. Such a laminated glass is used as a windshield glass for automobiles since it has a merit that fragments of broken glass are adhered to the film without scattering, and it is also used as a window glass (safety glass or security glass) of buildings since it is hard to be penetrated and is excellent in strength.

However, in terms of the process for producing the transparent substrate using the above mentioned transparent resin film, there are such problems that a high temperature environment of at least 70° C. or at least 120° C. is required and that since a high pressure of at least 10 atm is required, the production presents a major impact on the environment. Further, for the same reason, there is also a problem that a transparent substrate easily deformable by heat, such as a transparent resin substrate, cannot be used as the transparent substrate. Further, there is also a problem that when a transparent resin film is cut into a size of the transparent substrate, since trimmed films are wasted as unnecessary films, utilization efficiency of the transparent resin film is poor.

As a process for producing laminated glass solving these problems, a process disclosed in e.g. Patent Document 1 is known. In this process, first, a plate-shaped container constituted by a pair of glass substrates laminated via an adhesive spacer is produced, and next, a part of the spacer is opened, a curable resin composition is injected through the opening portion, and subsequently, the opening portion of the spacer is plugged to be closed, and the curable resin composition is cured by heating (including long time preservation at a room temperature) or exposure to UV rays, to produce a laminated glass (hereinafter this method is referred to as injection method). Accordingly, according to this process, since no high temperature environment or high pressure environment is required, it is possible to use a transparent substrate easily deformable by heat, and since no transparent resin film is used, it is possible to save a resource.

Patent Document 1: JP-A-2005-41747

DISCLOSURE OF THE INVENTION

Problems to be Solved by the Invention

However, in the technique of e.g. Patent Document 1 of injecting a curable resin composition into a flat-plate container constituted by a pair of transparent substrates, there is a problem that removal of bubbles caused by the injection takes a long time. Further, there is also a problem that since the curable resin composition has to have a low viscosity so that the composition can be injected, the composition has to contain a large amount of a curable compound having a relatively low molecular weight. Accordingly, the curable resin composition shows a high shrinkage between before and after curing, and the strength of a consequent laminated glass becomes insufficient.

It is an object of the present invention to provide a process for producing a transparent laminate, which has no limitation in the type of substrate, which allows high degree of freedom in the type of curable resin composition for forming an interlayer, which enables efficient utilization of resources for forming the interlayer, which requires no bubble-removable step as required in conventional injection methods, which is excellent in productivity, and which causes little impact on the environment; and to provide a transparent laminate produced by such a process. Here, in the present invention, a "curable resin composition" means a curable resin composition in an uncured state, and a cured product produced by curing the "curable resin composition" is hereinafter referred to as "cured curable resin composition" or simply as "cured resin".

Means for Solving the Problems

In order to achieve the above objects, the present invention provides a transparent laminate produced by sandwiching a curable resin composition between a pair of transparent substrates and sealing the curable resin composition by a sealing portion provided along the periphery of the transparent substrates in a reduced pressure atmosphere, and by curing the curable resin composition under a pressure higher than the pressure of the atmosphere at the time of sandwiching.

In the transparent laminate of the present invention, it is preferred that the transparent substrates are each made of a glass or a resin.

When the transparent substrates of the transparent laminate are each made of a glass, it is possible to provide a laminated glass to be used as a window glass for buildings or vehicles. When a polycarbonate is used as resin transparent substrates, it is possible to provide a transparent panel having a high shock resistance and being light in weight. This transparent panel is also usable as a window glass for buildings or vehicles. Further, the transparent laminate may be one in which a glass plate and a resin plate are bonded with the curable resin composition.

For the transparent laminate of the present invention, curved substrates having approximately the same curvature can be used as the pair of transparent substrates.

In a conventional transparent laminate employing a film as an interlayer, when the transparent substrates are ones having at least a certain curvature, the film is wrinkled and it is difficult to produce a transparent laminate. However, in a transparent laminate of the present invention produced by curing the transparent resin composition, the shape is not limited. For this reason, the present invention is particularly effective in a case of employing three-dimensionally and sharply curved transparent substrates to obtain a curved transparent laminate.

In order to achieve the above object, the present invention provides a process for producing a transparent laminate, comprising sandwiching a curable resin composition between a pair of transparent substrates and sealing the curable resin composition by a sealing portion provided along the periphery of the transparent substrates in an atmosphere of reduced pressure, and curing the curable resin composition under a pressure higher than the pressure of the atmosphere at the time of sandwiching.

Further, the present invention provides a process for producing a transparent laminate having a pair of transparent substrates and a layer of a cured product of a curable resin composition present between the pair of transparent substrates; the process comprising forming a sealing portion along the periphery of one of the transparent substrates for sealing the curable resin composition; supplying the curable resin composition in a region surrounded by the sealing portion on one of the transparent substrates; laminating the other transparent substrate on the supplied curable resin composition in a reduced pressure atmosphere to seal the curable resin composition between the pair of transparent substrates; subsequently placing the pair of transparent substrates sandwiching the curable resin composition in an atmosphere of higher pressure than that of the reduced pressure atmosphere; and curing the curable resin composition in the atmosphere of higher pressure.

According to these production processes, a curable resin composition is sandwiched between a pair of transparent substrates in a reduced pressure atmosphere, and the curable resin composition is cured under a pressure higher than the pressure of the atmosphere at the time of sandwiching. Accordingly, the problem that removable of bubbles caused by injection takes a long time does not occur, and even if there is a small space not filled with the resin composition at a time of lamination of the pair of transparent substrates under the reduced pressure, the space can be minimized or substantially eliminated by retaining the laminate under a higher pressure. Further, it is easy to provide a transparent laminate employing a thin resin layer, that has been difficult to achieve by conventional injection methods.

Accordingly, a transparent laminate produced by one of these production processes becomes a transparent laminate having no bubble. Further, since the laminate is completely sealed by a sealing portion provided along the periphery of the transparent substrates in the transparent laminate obtained, it is not likely that peeling of the peripheral portion occurs even under severe operation conditions, and thus, the transparent laminate has high durability.

Further, by producing a transparent laminate by the above production process, it is possible to employ a composition having a high viscosity or a curable compound having a high molecular weight for the curable resin composition, and accordingly, it is possible to obtain a cured resin having high strength when the composition is cured, and to obtain a transparent laminate having high mechanical strength as a whole. Accordingly, in the transparent laminate of the present invention, as compared with a conventional transparent laminate produced by injecting a curable resin composition having a low viscosity, it is possible to obtain a sufficient mechanical strength even if the transparent laminate is thin in the thickness.

In the production process of the present invention, it is possible to use curved substrates having approximately the same curvature, as the pair of transparent substrates. In a conventional process for producing a transparent laminate using a film as an interlayer, when the transparent substrates are curved substrates having at least a certain curvature, the film is wrinkled and production of a transparent laminate is difficult. However, according to the production process of the present invention, the shape of a transparent laminate to be produced is not limited. Accordingly, it is possible to easily produce a curved transparent laminate by using three dimensionally and sharply curved transparent substrates.

In the production process of the present invention, it is preferred that at least one of surfaces of the transparent substrates to be in contact with the curable resin composition is subjected to treatment with a coupling agent selected from the group consisting of a silane compound and a titanium compound in advance.

The coupling agent made of a silane compound is one called as a silane coupling agent, which is typically a compound having an organic group bonded to the silicon atom and a hydrolyzable group bonded to the silicon atom. The coupling agent made of a titanium compound is one called as a titanium coupling agent, which is typically a compound having an organic group bonded to a titanium atom and a hydrolyzable group bonded to a titanium atom. Any one of these coupling agents is applied as a surface treatment agent in advance to at least one of surfaces of the pair of transparent substrates to be in contact with the curable resin composition, and it is bonded to the surface of the transparent substrate by e.g. heating.

Thus, by employing a transparent substrate subjected to a surface treatment in advance, it is possible to improve the adhesion of a cured product of the curable resin composition to the transparent substrate. Accordingly, since the mechanical strength of a transparent laminate obtained improves, this process is suitable for a production of laminated glass.

In the production process of the present invention, it is preferred that the reduced pressure atmosphere for sandwiching the curable resin composition between the pair of transparent substrates is an atmosphere having a pressure of from 10 to 100 Pa.

If the pressure P1 of the atmosphere exceeds 100 Pa, bubbles remaining in the curable resin layer in the transparent laminate tend to be visible, and if the pressure P1 is lower than 10 Pa, since the degree of reduced pressure is high, forming of the reduced pressure atmosphere takes a long time to increase loss of time. Further, when the degree of reduced pressure is too high, a heat polymerization initiator or an additive such as a photopolymerization initiator, a polymerization inhibitor or a light stabilizer contained in the curable resin composition, is partially evaporated in a vacuum chamber to cause insufficient curing or to adversely affect performances of a cured resin layer produced by curing the composition, which is undesirable.

In the production process of the present invention, the pressure of the atmosphere for curing the curable resin composition is preferably an atmosphere of atmospheric pressure.

Thus, by using atmospheric pressure as the pressure of the atmosphere for curing that is higher than the pressure of the atmosphere for lamination, it is possible to eliminate a piece of equipment such as a pressure chamber for curing the curable resin composition. Further, when the reduced pressure atmosphere is an atmosphere having a pressure of from 10 to 100 Pa, it is possible to sufficiently increase the pressure difference from the reduced pressure atmosphere.

In the production process of the present invention, it is preferred that the curable resin composition is cured by heating or irradiation with UV rays. The curable resin composition curable by heating is usually a thermosetting resin composition containing a curable compound and a heat polymerization initiator, and the curable resin composition curable by UV rays is usually a photocurable resin composition containing a curable compound and a photopolymerization initiator.

According to such a production process, the thermosetting resin composition is curable by applying a heat and the photocurable resin composition is curable by irradiation with UV rays. As an alternative, it is possible to select a curable resin composition that is curable by preserving it for a long time at a room temperature. The curable resin composition is, among these, preferably a curable resin composition of photocurable type curable by UV rays. For example, when the thermosetting resin composition contains an acrylic type curable compound such as an acrylic ester, in order to induce an initiation reaction of a heat polymerization initiator, it is necessary to heat the composition to e.g. 80° C. Meanwhile, in a case of curing a curable resin composition of photocurable type containing an acrylic type curable compound by UV rays, the curing is possible only by irradiation with UV rays, and accordingly, it is possible to cure the curable resin composition with energy saving. Further, in the case of UV curing, since no heating is required, environmental impact is small and even a transparent substrate easily deformable by heat can be used. In the case of room-temperature curing, it is necessary to preserve the compound for e.g. one day or a few days for curing, but in the case of UV curing, it is possible to substantially cure the composition in a few minutes or a few tens of minutes, and accordingly, such a UV curing provides high productivity. Further, the curing reaction can be completed by a combined use of UV rays and heat, or by preserving such a composition for a predetermined period at a room temperature after it is irradiated with UV rays.

Further, the curable resin composition is preferably a curable resin composition forming a cured resin having high transparency by curing. The transparency of the curable resin composition after curing is preferably at most 6% in terms of the haze value of a transparent laminate obtained, for the purpose of maintaining the transparency of the transparent laminate. Further, a curable resin composition to be used for the sealing portion is preferably a curable resin composition forming a cured resin having high transparency after curing, for the purpose of maintaining the transparency of the entire transparent laminate.

In the production process of the present invention, it is preferred that the curable resin composition has a viscosity of at least 0.2 Pa·s at 25° C. and a viscosity of at most 50 Pa·s at 40° C.

In a case of producing a transparent laminate by employing a curable resin composition having such a viscosity, it is possible to use a curable resin composition having a high viscosity or a curable resin composition containing a curable compound having a high molecular weight. In order to make the viscosity of the curable resin composition at 25° C. be less than 0.2 Pa·s, it is necessary to add at least a predetermined amount of a curable compound having a low molecular weight to the composition, which increases shrinkage between before and after the curing and causes residual strain in the cured resin to deteriorate the mechanical strength. Further, if the viscosity at 40° C. exceeds 50 Pa·s, the fluidity of the curable resin composition decreases, and for example, even if the curable resin composition sandwiched between transparent substrates is exposed to atmospheric pressure, it takes a long time for the curable resin composition to spread and fill the entire gap between the transparent substrates since the fluidity is poor. For this reason, it takes a long time to eliminate an empty space not filled with the curable resin composition, in the gap between the transparent substrates, which may deteriorate the production tact time. From the viewpoint of the above viscosity and molecular weight, the curable resin composition preferably contains a curable compound having a molecular weight of at least 1,000 and a viscosity of at most 50 Pa·s at 40° C., for the purpose of producing the transparent laminate of the present invention.

In the production process of the present invention, the curable resin composition is preferably a curable resin composition of photocurable type which comprises at least one compound having 1 to 3 curable groups selected from the group consisting of acryloyloxy groups and methacryloyloxy groups, per molecule, and a photopolymerization initiator.

As described above, the curable resin composition of the present invention is preferably a curable resin composition curable by irradiation with light such as UV rays. The curable resin composition of photocurable type is preferably a curable resin composition containing a compound having an acryloyloxy group (that is an acrylic ester) or a compound having a methacryloyloxy group (that is a methacrylic ester) as a curable compound. Further, the number of these curable functional groups is preferably from 1 to 3 per molecule. When the curable resin composition is a curable resin composition of photocurable type having at least one type of these curable compounds and a photopolymerization initiator, the above features provided by curing by light such as UV rays can be sufficiently exhibited.

Effects of the Invention

According to the production process of the present invention, it is possible to provide a process for producing a transparent laminate which is not limited in the type of transparent substrates, which has high degree of freedom in the type of curable resin composition to form an interlayer, which enables to efficiently utilize resources for forming the interlayer, which does not require a bubble removal step as required in conventional injection methods, which is excellent in productivity, and which presents only a small environmental impact; and a transparent laminate produced by such a production process.

According to the present invention, no bubble is generated since a curable resin composition is sealed as it is sandwiched between a pair of transparent substrates in an atmosphere of a reduced pressure and the curable resin composition is cured under a higher pressure than the pressure of the atmosphere for the sandwiching; and further, the utilization efficiency of the curable resin composition is high since the sandwiched curable resin composition is enclosed by a sealing member provided along the periphery in advance.

Further, since high temperature or high pressure is not required for producing a laminate, environmental impact is small.

Further, unlike conventional processes, there is no need to inject a resin into a space constituted by flat plates, and it is possible to use a curable resin composition having a relatively high viscosity employing a curable compound having a relatively high molecular weight that can increase the strength of cured resin layer. Accordingly, it is possible to obtain a suitable strength for a laminated glass.

Furthermore, since the laminate is completely sealed by a sealing member provided along the periphery of the transparent substrates, even under severe operation conditions, peeling from the peripheral portion is hard to occur, and the laminate has high durability. Further, it is easy to provide a laminate having a thin resin layer that is difficult to achieve by conventional injection methods.

BRIEF EXPLANATION OF THE DRAWINGS

FIGS. 1(A) and 1(B): Explanation views showing a transparent substrate with a double sided adhesive tape adhered to four peripheral sides of the transparent substrate, wherein FIG. 1(A) is a plan view and FIG. 1(B) is a cross sectional view.

FIGS. 2(A) and 2(B): Explanation views showing a step of applying a curable resin composition on a transparent substrate, wherein FIG. 2(A) is a plan view and FIG. 2(B) is a cross sectional view.

EXPLANATION OF NUMERALS

Figure 1A:
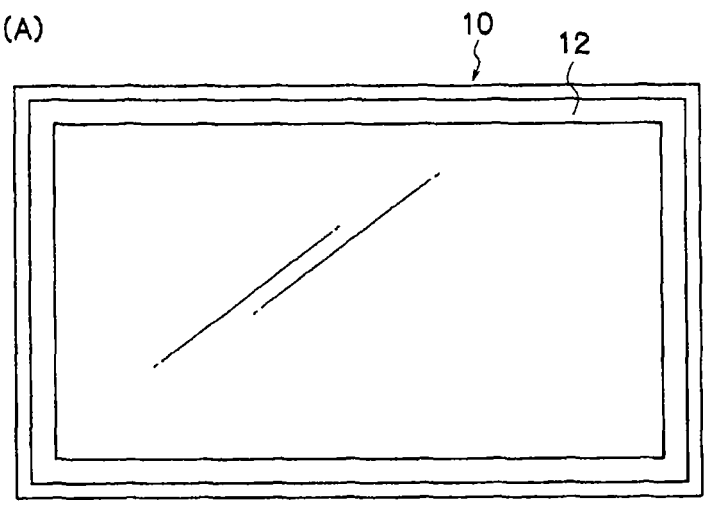

10: Transparent substrate, 12: double sided adhesive tape (sealing member), 13: region, 14: curable resin composition, 16: transparent substrate, 18: lower surface plate, 20: dispenser, 22: lead screw, 24: lead screw, 26: reduced pressure tank, 28: vacuum pump, 30: upper surface plate, 32: suction pad, 34: air cylinder, 36: curable resin composition, 40: UV irradiation apparatus, 42: high pressure mercury lamp, 44: reflective mirror, 46: reflective mirror, 48: transparent laminate having curable resin composition of uncured state

BEST MODE FOR CARRYING OUT THE INVENTION

The material of the transparent substrate of the present invention is preferably a glass or a resin. The glass is preferably a soda lime glass usually used for window members of buildings or vehicles. The resin material is preferably a resin material such as a polycarbonate or a polymethyl methacrylate, that has high transparency. The shape of the transparent substrate is not particularly limited, but it is preferably a flat plate shape or a curved plate shape, that are shapes used as those of windows. The size of the transparent substrate is not particularly limited. However, since the present invention enables to produce a large sized transparent laminate that is difficult to produce by conventional curable-resin-injection methods, the size of the transparent substrates and the size of a transparent laminate to be obtained, are preferably at least 600 mm×600 mm.

In the transparent substrate, at least one of surfaces to be in contact with the curable resin composition is preferably subjected to a treatment with a coupling agent selected from the group consisting of a silane compound and a titanium compound in advance. The coupling agent comprising a silane compound is one called as a silane coupling agent, which is typified by a compound having an organic group bonded to the silicon atom and a hydrolysis group bonded to the silicon atom. The coupling agent comprising a titanium compound is one called as a titanium coupling agent, which is typified by a compound having an organic group bonded to a titanium atom and a hydrolysis group bonded to a titanium atom. The organic group bonded to the silicon atom or a titanium atom is an organic group wherein the atom at the bonding end is a carbon atom and the carbon atom is bonded to the above metal atom. Specifically, the group may, for example, be an alkyl group, an alkenyl group or a functional-group-bonded alkyl group. The functional group may, for example, be an acryloyloxy group, a methacryloyloxy group, an epoxy group or an amino group. The hydrolysis group is a group producing a hydroxyl group when it reacts with water, and it may, for example, be an alkoxy group, a chlorine atom, an acyl group or an amino group.

The coupling agent is preferably a silane coupling agent comprising a functional-group-bonded alkyl group and an alkoxy group each bonded to the silicon atom. The coupling agent preferably has a functional group capable of forming a chemical bond with a curable compound in the curable resin composition at a time of curing the curable resin composition. Such a functional group may, for example, be an acryloyloxy group or a methacryloyloxy group. A specific silane coupling agent may, for example, be 3-methacryloyloxypropyltrimethoxysilane.

The coupling agent is applied in advance to a surface of at least one of the pair of transparent substrates to be in contact with the curable resin composition, and they are heated so that the coupling agent is bonded to the surface of transparent substrate. By this surface treatment, it is considered that a hydrolyzable group of the coupling agent is hydrolyzed to form a hydroxyl group, and the hydroxyl group bonds the coupling agent to the substrate surface. The surface treatment method may, for example, be a method of dissolving a coupling agent in a solvent to produce a coupling agent solution, applying the solution on the transparent substrate surface or immersing the transparent substrate in the solution and taking it out, heating the transparent substrate to vaporize and remove the solvent, and thereafter, heating the transparent substrate to bond the coupling agent to the transparent substrate surface. Instead of the coupling agent solution, it is possible to use a solution obtainable by dissolving the coupling agent in a solvent and partially hydrolyzing the coupling agent. Specifically, for example, a solution of "silane coupling agent: water: iPA (isopropyl alcohol)=0.3:0.5:99.2" is stirred for 10 hours at a room temperature to obtain a solution in which the silane coupling agent is hydrolyzed to be partially changed to a silanol, and subsequently, a transparent substrate is immersed in the solution for 1 minute and it is taken out. Thereafter, the transparent substrate is subjected to a heat treatment in an oven of 150° C. for 30 minutes so as to make the silane coupling agent react with the glass surface.

By using the transparent substrate subjected to the surface treatment, the adhesion of the curable resin to the transparent substrate increases and the mechanical strength of the transparent laminate improves.

Further, the pair of transparent substrates may be curved substrates having approximately the same curvature. In a conventional transparent laminate using a film as an interlayer, a wrinkle may be formed in the film when the transparent substrates are curved substrates, and there is a case where production of transparent laminate is difficult. However, in a case of transparent laminate produced by sandwiching a curable resin composition between transparent substrates and curing the composition, the shape is not limited. For this reason, even if three-dimensionally curved transparent substrates are used, a transparent laminate having a good three-dimensional curve can be obtained. This shape is not obtainable by conventional processes for producing a laminated glass employing a film.

The transparent laminate of the present invention is produced by the production process of the present invention.

Now, the production process of the present invention and a transparent laminate obtainable by the process will be described.

First, one of a pair of transparent substrates is picked up, and a sealing portion is provided along the periphery of the transparent substrate. The sealing portion can be provided by pasting a sealing member such as a double sided adhesive tape. Next, in a region surrounded by the sealing portion on the transparent substrate, a curable resin composition is supplied. The amount of the curable resin composition to be supplied is preliminarily selected so that a space sealed by the pair of transparent substrates and the sealing member is filled with the curable resin composition. At this time, it is possible to preliminarily determine the volume of a cured resin layer, by considering a volume reduction due to a curing shrinkage of the curable resin composition. The method for supplying the composition may be such that one of the transparent substrates is placed flatly, and the curable resin composition is supplied in a dot form, a linear form or an area form by a supplying means such as a dispenser or a die coater. Subsequently, in a reduced pressure atmosphere such as a vacuum (including substantial vacuum) atmosphere, the other transparent substrate is overlaid via the sealing portion to thereby sandwich and seal the curable resin composition between the pair of transparent substrates. Further, as the case requires, the curable resin composition is sandwiched for a predetermined time in the reduced pressure atmosphere. Thereafter, the reduced pressure atmosphere is changed to an atmosphere of higher pressure (for example, atmospheric pressure), whereby the pair of transparent substrates are pushed in directions so as to closely contact with each other by the increased pressure, and at the same time, since the volume of empty portion remaining in the sealed space is shrunk by the differential pressure between these atmospheres, the curable resin composition flows into the reduced-pressure empty space in the sealed space, that is sealed by the pair of transparent substrates and the sealing portion, and the entire sealed space is uniformly filled with the curable resin composition. Thereafter, by curing the curable resin composition, the transparent laminate of the present invention can be produced.

In order to improve the adhesion between the pair of transparent substrates, it is preferred to apply a curable resin composition to one surface or both surfaces of the sealing member to be in contact with the transparent substrate(s) in advance. Thus by applying the curable resin composition on surface(s) of the sealing member, the airtightness of the sealed space is improved, and accordingly, it is possible to maintain the reduced pressure of the sealed space even after the reduced pressure atmosphere is changed to the higher pressure atmosphere. In a case of providing the curable resin composition between an adhesive tape and the transparent substrate(s), since the applied curable resin composition functions in the same way as an adhesive layer, it is also possible to use a single-sided adhesive tape or a tape having no adhesive layer as the sealing member. Further, for the sealing member, instead of a tape, it is possible to use a high viscosity curable resin composition mixed with spacer particles, that is other than the curable resin composition to be sandwiched between the transparent substrate. Further, when the curable resin composition to be used for the sealing portion is a thermosetting resin composition, it is curable by heating, and when the composition is a UV-curable resin composition, it is curable by irradiation with UV rays.

The reduced pressure atmosphere is preferably a reduced pressure atmosphere satisfying the following formula provided that the pressure of the reduced pressure atmosphere is $P1$.

$$10\ Pa \leq P1 \leq 100\ Pa$$

If $P1$ exceeds 100 Pa, bubbles remaining in the curable resin in the transparent laminate tend to be visible, and if it is lower than 10 Pa, since the degree of reduced pressure is high, forming of the reduced pressure atmosphere requires a large amount work and increases loss of time. Further, if the degree of reduced pressure is too high, curable compounds or other components (heat polymerization initiator, photopolymerization initiator, polymerization inhibitor or light stabilizer) contained in the curable resin composition are adversely affected, such being not preferred. For example, if the degree of reduced pressure is too high, these compounds may be vaporized. More preferable $P1$ is from 30 to 50 Pa.

In a case of sandwiching and sealing the curable resin composition between the pair of transparent substrates and retaining the sandwiching of the curable resin composition for a predetermined time in the reduced pressure atmosphere, a reduced-pressure-atmosphere-retention time from the sealing of the curable resin composition to raising of the pressure of the atmosphere, is not particularly limited. So long as the sealing state is maintained, the pressure of the atmosphere may be raised immediately after the curable resin composition is sealed. By maintaining the reduced pressure state for a certain time after the sealing, the curable resin composition flows in the sealed space to make the distance between the transparent substrates uniform, and even if the pressure of the atmosphere is raised, the sealing state can be easily maintained. This reduced-pressure-retention time may be a long time of several hours, but from the viewpoint of productivity, it is preferably within 1 hour, particularly preferably within 10 minutes.

The higher pressure atmosphere that has a higher pressure than the above reduced pressure atmosphere, is preferably an atmosphere of atmospheric pressure. In the case of using atmospheric pressure atmosphere, special equipment for curing the curable resin composition becomes unnecessary. However, the higher pressure than the pressure of the reduced pressure atmosphere is not limited thereto, and it is preferably a pressure at least 50 kPa, particularly at least 100 kPa, higher than the pressure of the reduced pressure atmosphere.

When the curable resin of the present invention is a thermosetting resin composition, it is curable by application of heat, and when it is a photocurable resin composition, it is curable by irradiation of UV rays. As an alternative, a curable resin composition that is curable by a long time preservation at a room temperature, may be selected. Further, the curable resin composition preferably contains, besides a heat polymerization initiator or a photopolymerization initiator, a polymerization inhibitor in an amount smaller than these polymerization initiators. Such a polymerization inhibitor contained can improve stability of the curable resin composition and can adjust the molecular weight of a resin layer formed by curing. Further, the curable resin composition preferably contains a light stabilizer such as a UV-absorbing agent or a radical-capturing agent. Such a light stabilizer contained can improve the durability against light of a resin layer produced by curing, such being preferred.

The curable resin composition is preferably a curable resin composition of photocurable type curable particularly by UV rays. For example, when the photocurable resin composition contains an acryloyloxy group-containing curable compound such as an acrylic ester, it is necessary to heat the thermosetting resin composition to e.g. 80° C. in order to induce an initialization reaction of a heat polymerization initiator. On the other hand, in a case of curing a curable resin composition of photocurable type containing an acryloyloxy group-containing curable compound by UV rays, since only UV irradiation is required, it is possible to cure the curable resin composition with energy saving. Further, in the case of UV curing, since the temperature does not rise, environmental impact is small and even a transparent substrate easily deformable by heat can be used. In a case of room-temperature curing, it is necessary to preserve a curable resin composition for e.g. one day or a few days for curing, but in the case of UV curing, curing is substantially possible in a few minutes or a few tens of minutes, whereby the productivity is high. Further, it is also possible to use UV rays and heat in combination or to carry out a UV curing followed by a preservation at a room temperature for a predetermined time to complete a curing reaction.

In the present invention, it is possible to use a curable resin composition having a high viscosity or a composition containing a curable compound having a high molecular weight. As the curable resin composition, it is preferable to select a curable resin composition satisfying the following formula provided that the viscosity of the curable resin composition is Vr.

$0.2\ Pa \cdot s \leq Vr$ (viscosity of curable resin composition at 25° C.), and $Vr \leq 50\ Pa \cdot s$ (viscosity of curable resin composition at 40° C.)

In order to satisfy the condition that Vr is less than 0.2 Pa·s at 25° C., it is necessary to add at least a certain amount of a curable compound having a low molecular weight to the curable resin composition, which increases shrinkage between before and after curing and causes residual strain in a cured resin to decrease the mechanical strength. Further, if Vr at 40° C. exceeds 50 Pa·s, the fluidity of the curable resin composition decreases in the process for producing a transparent laminate, and, for example, even if the curable resin composition sandwiched between the substrates is opened to atmospheric pressure, it takes a long time for the curable resin composition to spread in the entire gap between the transparent substrates since the fluidity is poor. Accordingly, it takes a long time for an empty space in the gap between the transparent substrates not filled with the curable resin composition to disappear, which tends to deteriorate the production tact time. It is more preferable that the viscosity of the curable resin composition is at least 0.5 Pa·s at 25° C. and the viscosity is at most 10 Pa·s at 40° C.

Further, in a curable resin composition having a high viscosity or a composition containing a curable compound having a high molecular weight, it is possible to reduce the number of chemical bonds in the curable resin composition, whereby the shrinkage between before and after the curing becomes small and it becomes possible to increase the mechanical strength of the cured resin. However, most of curable compounds having a large molecular weight, such as a curable oligomer, have a high viscosity. For this reason, in order to suppress residual bubbles caused by the reduced-pressure lamination while maintaining the mechanical strength, it is preferred to dissolve into a curable oligomer having a high molecular weight a curable monomer having a smaller molecular weight to adjust the viscosity for use. The curable oligomer having a high molecular weight is preferably one having a molecular weight of at least 1,000, more preferably one having a molecular weight of at least 2,000. From the above viewpoints of viscosity and molecular weight, a curable resin composition containing a curable compound having a molecular weight of at least 1,000 and a viscosity of at most 50 Pa·s at 40° C. is preferred for producing the transparent laminate of the present invention.

Further, the curable resin composition is preferably a curable resin composition forming a cured resin having high transparency by curing. The transparency of the curable resin composition after it is cured is preferably at most 6% in terms of the haze value of a transparent laminate obtained, for the purpose of maintaining the transparency of the transparent laminate. Further, another curable resin composition to be used for the sealing portion is also preferably a curable resin composition forming a cured resin having high transparency by curing, for the purpose of maintaining the transparency of the entire transparent laminate.

In a transparent laminate, provided that the distance between a pair of transparent substrates, that is the thickness of a curable resin layer, is Ts, the thickness of the transparent substrates, whichever thinner, is T1 and the thickness of the other substrate is T2, Ts preferably satisfies the following formula. Here, the thicknesses T1 and T2 may be the same.

$T1 \times 0.05 \leq Ts \leq T2 \times 1.5$

When the thickness Ts of the curable resin layer is less than 5% based on the thickness of the transparent substrates, whichever thinner, the strength required for the transparent laminate cannot be obtained, and when the thickness Ts exceeds 150% based on the thickness of the transparent substrates, whichever thicker, the substrate of the transparent laminate is needlessly thick.

When the thickness of the curable resin layer in the transparent laminate is constant, the thickness of a sealing portion is equal to the thickness of the curable resin layer. When only a double sided adhesive tape of non-compressive type is used as a sealing member, the thickness of the sealing portion becomes substantially equal to the thickness of the double sided adhesive tape. Further, when a curable resin composition for forming a sealing portion is provided on an upper face of the double sided adhesive tape (refer to FIG. 3), the thickness of the sealing portion becomes substantially equal to the total thickness of the double sided adhesive tape and a cured product layer of the curable resin composition. When a sealing member made of a curable resin composition containing spacer particles is employed, the thickness of the sealing portion is defined by the size of the spacer particles.

Further, in the transparent laminate, provided that the transmittance of the sealing portion sandwiched between the pair of transparent substrates for light incident perpendicularly to the transparent substrates is Is, and that the transmittance of the curable resin layer sandwiched between the pair of transparent substrates defined in the same manner is Ir, they preferably satisfy the following formula.

$0.9 \leq Is/Ir \leq 1.1$

When the transmittance Ir of the curable resin layer and the transmittance Is of the sealing portion satisfy the above formula, the entire transparent laminate has substantially an uniform transmittance, and the entire transparent laminate can be used as a light transmitting media.

Now, with reference to the attached drawings, preferred embodiments of the transparent laminate and its production process according to the present invention will be described.

Figure 3:
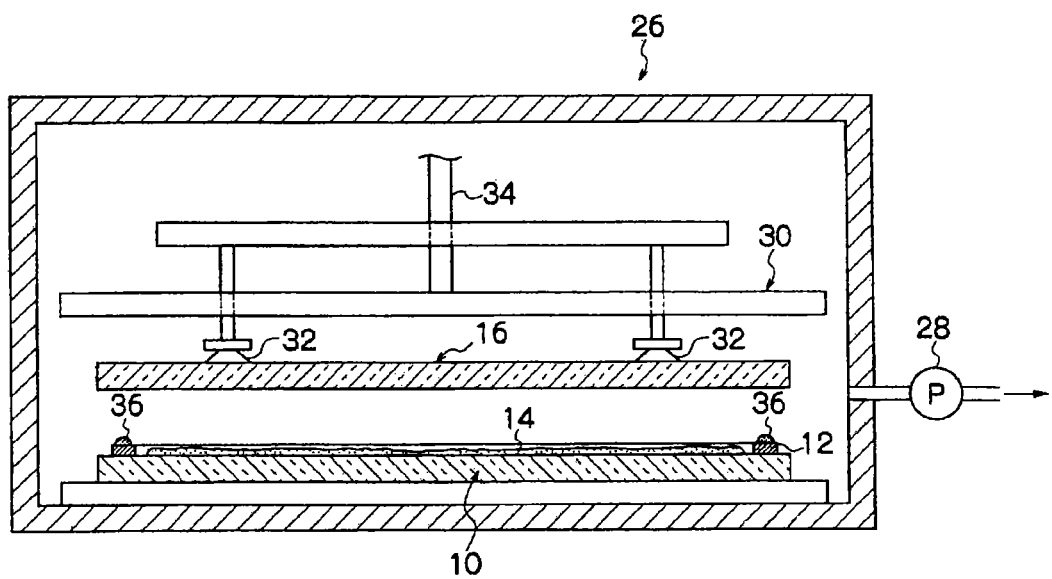
FIG. 3: An explanation view showing a pair of transparent substrates that are about to be laminated via a double sided adhesive tape under a reduced pressure.
Figure 4:
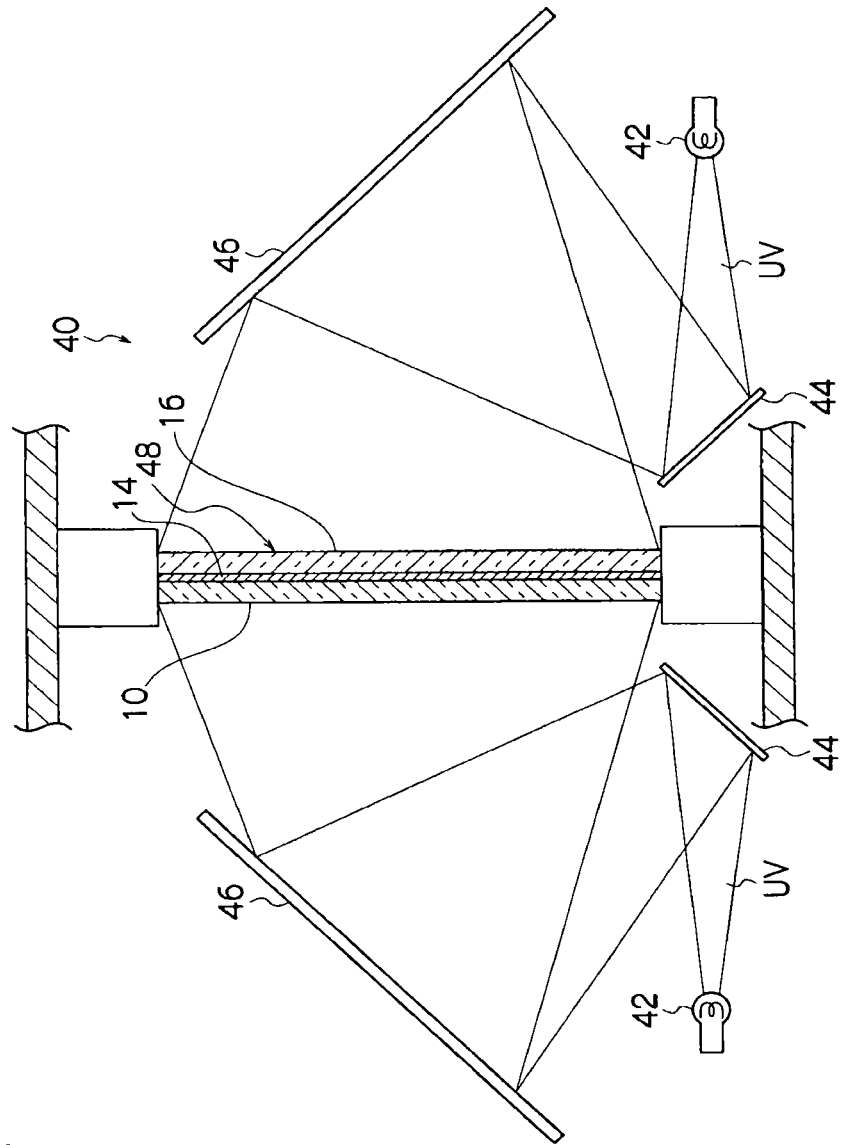
FIG. 4: An explanation view showing a schematic structure of a UV irradiation apparatus.
Figure 5:
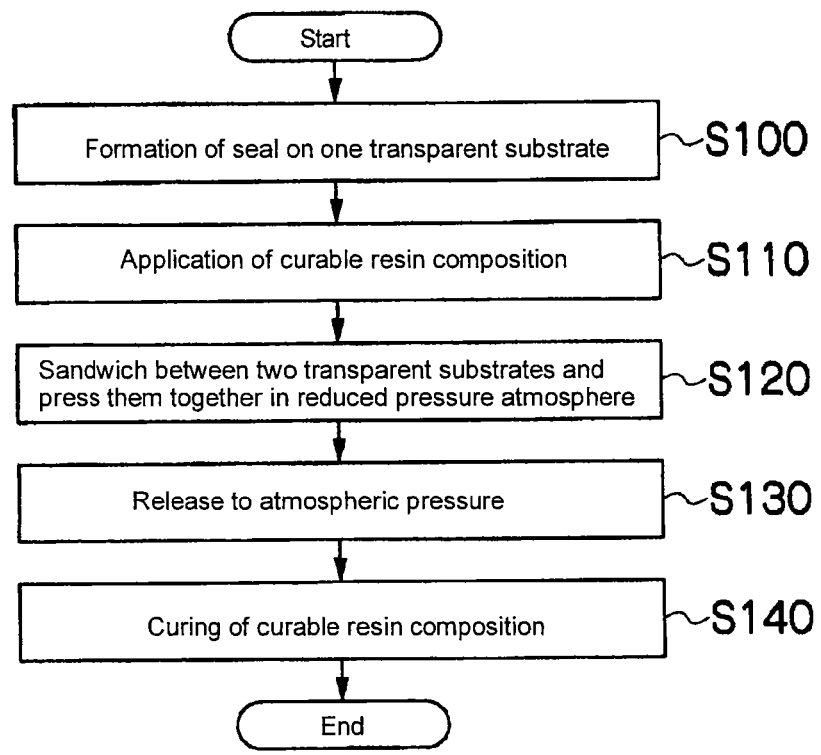
FIG. 5: A flowchart showing a preferred process for producing the transparent laminate of the present invention.

FIGS. 1 to 4 are views showing a preferred process for producing the transparent laminate of the present invention, and FIG. 5 shows a flow chart of the preferred process for producing the transparent laminate.

The preferred process for producing the transparent laminate of the present invention will be described with reference to these views.

Figure 1B:
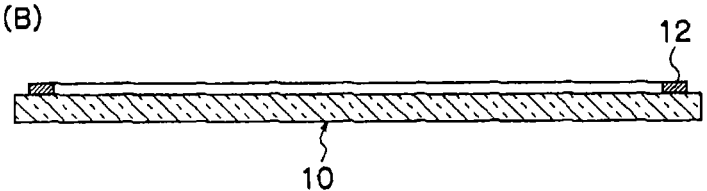
Figure 2:
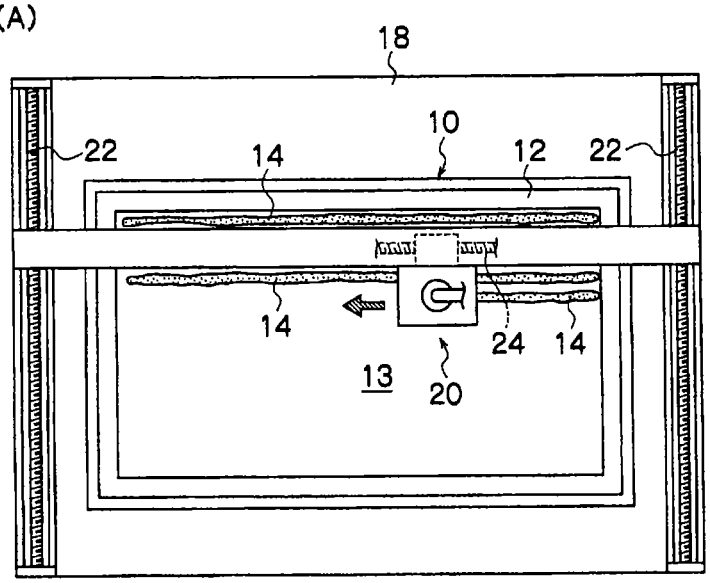
Figure 2:
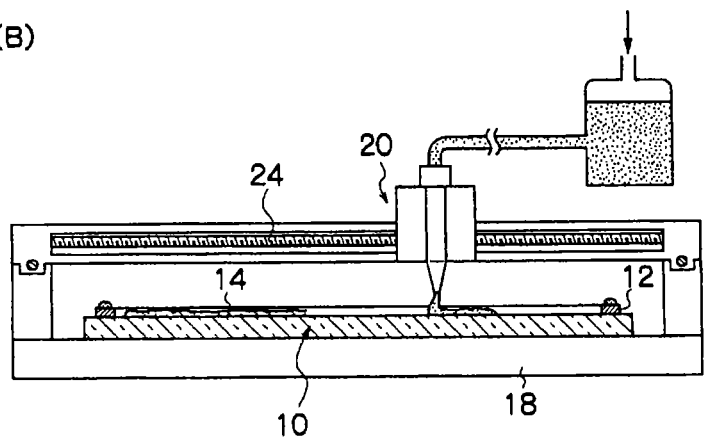

First, a pair of transparent substrates are prepared, and as shown in FIGS. 1(A) and 1(B), a transparent substrate 10 is selected from these transparent substrates, and a double sided adhesive tape 12 is pasted along four peripheral sides of the transparent substrate 10 to form a sealing portion (S(step) 100).

Next, as shown in FIGS. 2(A) and 2(B), a curable resin composition 14 is applied (supplied) to a rectangular region 13 on the transparent substrate 10 surrounded by the double sided adhesive tape 12 (S110). The amount of the curable resin composition 14 is preliminarily set to an amount of the curable resin composition 14 required for filling a space enclosed by the double sided adhesive tape 12 and the pair of transparent substrates 10 and 16 (refer to FIG. 3). Application of the composition is carried out by placing the transparent substrate 10 flatly on a lower surface plate 18 and the composition 14 is applied in a linear form, a belt form, or a dot form by a dispenser 20 movable in the horizontal direction as shown in FIGS. 2(A) and 2(B). The dispenser 20 is movable horizontally within the entire region of the region 13 by a known horizontal moving mechanism comprising a pair of lead screws 22 and 22 and a lead screw 24 perpendicular to the lead screws 22 and 22. Here, instead of the dispenser 20, a die-coating means may also be employed.

Subsequently, as shown in FIG. 3, the pair of transparent substrates 10 and 16 are moved into a reduced pressure tank 26, and the air in the reduced pressure tank 26 is evacuated by a vacuum pump 28. Thereafter, in a reduced pressure environment such as a vacuum (including a substantial vacuum) environment, the transparent substrate 16 is sucked by suction pads 32, 32 . . . of an upper surface plate 30, and in this state, it is lowered toward the transparent substrate 10 waiting below by operation of an air cylinder 34. Then, the pair of transparent substrates 10 and 16 are overlaid (laminated) via the double-sided adhesive tape 12, and they are pressed together under the pressure of the reduced pressure atmosphere for a predetermined time (S120). Here, the number and the positions of the suction pads 32 attached to the upper surface plate 30 depend on e.g. the size of the transparent substrate 16. Further, the degree of reduced pressure at the time of lamination is preferably from 10 to 100 Pa, more preferably from 30 to 50 Pa.

Next, when the reduced pressure atmosphere in the reduced pressure tank 26 is released to e.g. atmospheric pressure (S130), the pair of transparent substrates 10 and 16 are pressed so as to be contact together. At the same time, the volume of an empty space remaining in the sealed space is shrunk according to the pressure difference between the atmospheres, and the curable resin composition 14 flows into the reduced pressure empty space in the sealed space, whereby the entire sealed space is uniformly filled with the curable resin composition 14. Thereafter, by curing the curable resin composition 14, a transparent laminate of this example is produced.

Accordingly, according to the transparent laminate produced by this process, the pair of transparent substrates 10 and 16 are closely contacted by the atmosphere of reduced pressure to form a transparent laminate having no bubble. Further, since the sealed space is completely sealed by a double sided adhesive tape 12 pasted along the periphery of the transparent substrate 10, e.g. peeling from the periphery is hard to occur even under severe operation conditions, and its durability is high.

Further, in order to improve the adhesion of the pair of transparent substrates 10 and 16, it is preferred to paste a curable resin composition 36 for forming a sealing portion on an upper face of the double sided adhesive tape 12 as shown in FIG. 3. Thus, by applying the curable resin composition 36 on the upper face of the double sided tape 12, the airtightness of the sealed space is improved, the degree of reduced pressure of the sealed space can be maintained even after the laminate is released to atmospheric pressure. Further, instead of the double sided adhesive tape, it is possible to apply a curable resin composition having a high viscosity and mixed with spacer particles, that is other than the curable resin composition to be applied on the glass substrate surface. Further, when the curable resin composition 36 applied on the upper face of the double sided adhesive tape 12 and the curable resin composition in the sealed space, are each a photocurable resin composition, the curable resin composition 14 is curable by using an UV irradiation apparatus 40 shown in FIG. 4. The UV irradiation apparatus 40 is an apparatus for irradiating UV rays emitted from high pressure mercury lamps 42, 42, reflected by reflective mirrors 44, 44, 46, 46 and incident onto the entire regions of both surfaces of a transparent laminate wherein an uncured curable resin composition is sandwiched. By this step, the curable resin composition 36 applied to the upper face of the double sided adhesive tape 12 and the curable resin composition 14 in the sealed space can be cured at the same time. Here, when the curable resin composition 14 is a thermosetting resin composition, it is curable by applying heat.

By producing a transparent laminate by such a production process, it is possible to use as the curable resin composition 14 a curable resin composition having a high viscosity or a curable resin composition containing a curable compound having a high molecular weight, and accordingly, it is possible to form a cured resin having high strength by curing, and to obtain a transparent laminate having high mechanical strength as a whole.

Accordingly, as compared with a conventional transparent laminate produced by injecting a low viscosity curable resin composition, the transparent laminate of the present invention can have a sufficient mechanical strength even if its thickness is thin. Further, it is possible to produce a transparent laminate having an extremely small thickness that is not obtainable by conventional injection methods.

When the curable resin composition 14 is a photocurable resin composition, since it is curable only by irradiation of UV rays as shown in FIG. 4, the photocurable resin composition can be cured with energy saving. Further, since the temperature does not rise, the environmental impact is small, and even a transparent substrate easily deformable by heat can be used.

Curable Resin Composition

The curable resin composition of the present invention is a curable resin composition that is curable by an effect of light or heat to form a cured resin. It may be a room-temperature-curable resin curable by a long time preservation at a room temperature. The curable resin is preferably a composition containing a compound having an any type of polymerizable vinyl group and a photopolymerization initiator. Further, it may be a curable resin composition curable by a reaction between a vinyl group and a thiol group; a curable resin composition curable by a combination of an epoxy group and a photo-cation-generating agent generating a cation by light; or a curable resin composition curable by a reaction between a vinyl group bonded to a silicon atom and a hydrogen atom bonded to a silicon atom. Particularly, it is preferably a curable resin composition of photocurable type having at least one type of compound having a curable group selected from the group consisting of an acryloyloxy group and a methacryloyloxy group, and a photopolymerization initiator, for the reason that its curing speed is high and it forms a cured resin having high transparency.

The compound (hereinafter referred also to as (meth)acrylate type compound) having a curable group (hereinafter referred to as (meth)acryloyloxy group) selected from the group consisting of an acryloyloxy group and a methacryloyloxy group, is preferably a compound having 1 to 6 (meth) acryloyloxy groups per molecule. Particularly, in order to prevent the cured resin from being too hard, a compound having from 1 to 3 (meth)acryloyloxy groups per molecule is preferred. The (meth)acrylate type compound may be a compound (hereinafter referred to as acrylate type monomer) having a relatively low molecular weight, or it may be a compound (hereinafter referred to as (meth)acrylate type oligomer) having a repeating unit and having a relatively high molecular weight. Further, the (meth)acrylate type compound is preferably a compound of aliphatic type or alicyclic type containing minimum amount of aromatic ring.

The (meth)acrylate type monomer is preferably a compound having a low vapor pressure to sufficiently suppress the volatility in a case of supplying the monomer to the transparent substrate in the reduced pressure atmosphere in a chamber. The (meth)acrylate type oligomer is preferably a (meth) acrylate type oligomer having a molecular structure having a chain containing at least two repeating units such as a polyurethane chain, a polyester chain, a polyether chain or a polycarbonate chain, and a (meth)acryloyloxy group. For example, it may be a (meth)acrylate type oligomer that is called as an urethane acrylate oligomer having an urethane chain (usually it further contains a polyester chain or a polyether chain) and at least two (meth)acryloyloxy groups. As described above, the oligomer preferably has a molecular weight of at least 1,000, more preferably at least 2,000. If the viscosity of the (meth)acrylate type oligomer is too high, it is preferred to use it in combination with an acrylate type monomer to decrease the viscosity of the entire (meth)acrylate type compound.

Further, when the (meth)acrylate type compound is a compound having a hydroxyl group in the molecule, it is possible to improve the adhesion to a transparent substrate, particularly to a glass substrate, such being preferred. The content of the (meth)acrylate type compound having a hydroxyl group is preferably at least 30%, more preferably at least 50% in terms of weight ratio based on the entire (meth)acrylate type compound.

The curable resin composition of the present invention is preferably a curable resin composition of photocurable type containing a (meth)acrylate type compound and a photopolymerization initiator. The curable resin composition of photocurable type is curable by irradiation of UV rays or visible light to form a cured resin. The (meth)acrylate type compound in the curable resin composition is one comprising at least one type of acrylate type monomer, one comprising at least one type of (meth)acrylate type oligomer, or one comprising at least one type of acrylate type monomer and at least one type of (meth)acrylate type oligomer. Particularly, it is preferably one comprising at least one type of (meth)acrylate type oligomer or one comprising at least one type of (meth) acrylate type oligomer and at least one type of acrylate type monomer.

By employing a heat polymerization initiator instead of the photopolymerization initiator in the curable resin composition of photocurable type, a curable resin composition of thermosetting type containing a (meth)acrylate type compound is formed. Such a curable resin composition of photocurable type or thermosetting type may contain various types of additives such as a polymerization inhibitor, a light stabilizer, a UV absorbing agent or an antioxidant other than the photopolymerization initiator or the heat polymerization initiator. The viscosity of such a curable resin composition is preferably at least 0.2 Pa·s at 25° C. and at most 50 Pa·s at 40° C. as described above.

Another curable resin composition that forms a suitable resin layer by UV curing may be a curable resin composition of photocurable type containing: a polyene compound such as triallyl isocyanurate having from 1 to 6 vinyl groups per molecule; a polythiol compound such as triethylene glycol dimercaptan having from 1 to 6 thiol groups per molecule, at a content ratio at which the numbers of moles of the vinyl groups and the thiol groups are substantially equal; and containing a photopolymerization initiator. Further, a curable resin composition containing an epoxy group having at least two epoxy groups and a photo-cation-generating agent, which is polymerizable by photo-cation polymerization, is also known, and such a curable resin composition of photocurable type may be used in an amount within a range that the cured product does not become too hard. Further, the thermosetting resin composition may be a transparent dual-liquid type silicone resin consisting of a silicone compound having a vinyl group at an end of the molecule and a compound having a hydrosilyl group. To such a thermosetting composition, likewise the above, various types of additives such as a photopolymerization initiator, a light stabilizer, a UV absorbing agent or an antioxidant may be mixed.

Polymerization Initiator

The photopolymerization initiator for photopolymerizing a (meth)acrylate type compound or the photopolymerization initiator for causing reaction between a polyene compound and a polyol compound, may, for example, be a photopolymerization initiator of acetophenone type, ketal type, benzoin type, benzoin ether type, phosphine oxide type, benzophenone type, thioxanthone type or quinone type, and it is particularly preferably a photopolymerization initiator of benzoin ether type such as benzoin isopropyl ether or a photopolymerization initiator of acetophenone type. Further, the photo-cation-generating agent for curing an epoxy compound, may, for example, be a compound of onium salt type.

The heat polymerization initiator for heat polymerizing the (meth)acrylate type compound may, for example, be any one of peroxides such as benzoyl peroxide or an azo type compound such as azobisbutyronitrile. Further, a catalyst such as platinum is preferably used for curing the dual liquid type silicone.

Additives

The polymerization initiator may, for example, be of a hydroquinone type such as 2,5,-di-t-butyl hydroquinone, a catechol type such as p-t-butyl catechol, an anthraquinone type, phenothiazine or a hydroxytoluene type. The light stabilizer may be a UV absorbing agent of e.g. benzotriazole type, benzophenone type or salicylate type, or a radical capturing agent of e.g. hindered amine type. Further, as the antioxidant, a compound of phosphorus type or sulfur type may be employed. Further, in order to form a clear colored cured resin layer, a pigment or a dye may be added to the curable resin composition. The polymerization initiators or these additives are preferably compounds having relatively large molecular weights and low vapor pressures at a reduced pressure since they are used in a reduced pressure atmosphere.

EXAMPLES

Now, examples carried out for checking the effectiveness of the present invention will be described. Examples 1 and 2 are examples of the present invention, and Example 3 is a comparative example.

Example 1

First, to an end of a soda lime glass (it is referred to as substrate A) of 610 mm long, 610 mm wide and 2 mm thick, a double sided adhesive tape (sealing member) of 1 mm thick and 10 mm wide was pasted as it was separated from a mold-release film, so as to be pasted along each of four side portions of the substrate A. Next, 100 parts of urethane acrylate oligomer (UF8001G manufactured by Kyoeisha Chemical Co., Ltd.) and 1 part of benzoin isopropyl ether (polymerization initiator) were uniformly mixed to form a UV curable resin composition, and the composition was applied on the upper face of the double sided adhesive tape by a dispenser to have a coating thickness of about 0.3 mm.

Meanwhile, a curable resin composition (it is referred to as composition P) of UV curable type was produced by uniformly mixing 70 parts of an urethane acrylate oligomer (UF8001G manufactured by Kyoeisha Chemical Co., Ltd.), 30 parts of a dual-functional methacrylate monomer (Light-ester 14EG manufactured by Kyoiesha Chemical Co., Ltd.) and 1 part of benzoin isopropyl ether. The composition P was placed in an open container, they were placed in a reduced pressure chamber, inside the chamber was evacuated to 200 Pa·s, and this state was maintained for 10 minutes to carry out a bubble-removal treatment. 10 g of the composition P was put in a container (HT-2 DB-100 manufactured by Brookfield Engineering), they were put in a keep-warm apparatus for viscosity measurement, and the temperature of the composition P was adjusted to 40° C. Next, a spindle (SC4-31 manufactured by Brookfield Engineering) for measurement attached to a viscosity meter (LVDV-II+ pro manufactured by Brookfield Engineering) was immersed in the composition P in the measurement container, this state was maintained for 15 minutes while the spindle was rotated, and thereafter, the viscosity of the composition P was measured. As a result, it was 16 Pa·s. Here, from this result, it is apparent that the viscosity of the composition P at 25° C. apparently exceeds at least 0.5 Pa·s considering the temperature dependence of resin.

Next, in a region for a surface of the substrate A surrounded by the double sided adhesive tape, the composition P was supplied at a plurality of points by using a dispenser at 25° C. (room temperature) so that the total weight became 380 g. Subsequently, the substrate A was placed on the upper face of a lower surface plate that was on the lower side of a vacuum chamber in which a pair of surface plates with an elevating device were provided.

Next, a soda lime glass plate (it is referred to as substrate B) having the same shape and the same thickness as those of substrate A, was held on the lower face of an upper surface plate on the upper side of the elevating device in the vacuum chamber by using suction pads, and the substrate B was retained at the same position as the substrate A in horizontal directions and at a distance of 10 mm from the substrate A in the vertical direction.

Subsequently, the vacuum chamber was closed and the inside of the chamber was evacuated to about 30 Pa. Thereafter, the upper and lower surface plates were moved closer by the elevating device in the vacuum chamber, the substrate A and the substrate B were press-bonded by a pressure of 2 kPa, and this state was retained for 1 minute. Thereafter, the inside of the vacuum chamber was returned to atmospheric pressure within 30 seconds, whereby the substrate A and substrate B were closely bonded together via the composition P.

Next, the upper and lower surface plates were moved away from each other by the elevating device, and a laminate (it is referred to as laminate C) constituted by the substrates A and B, that was sucked by the suction pads of the upper surface plate on the upper side, was released from the upper surface plate on the upper side. Subsequently, an upper portion of the double sided tape along the periphery of the laminate C was irradiated with UV rays emitted from a fiber light source using a high pressure mercury lamp as the light source and incident through a glass (substrate B), to thereby cure the curable resin composition curable by UV rays that had been applied to the tape in advance. Thereafter, the laminate C was maintained horizontally and preserved for about one hour.

Next, the laminate C was uniformly irradiated with UV rays emitted from high pressure mercury lamps and incident into both surfaces, so as to cure the composition P, to obtain a transparent laminate (it is referred to as laminate D) having a structure of laminated glass. The laminate D was produced without a bubble-removal step as required in conventional processes using an injection method, but the laminate D does not contain no residual bubble defects observed in the cured resin layer, and its haze value was about 1% and the laminate was good with high transparency. Here, the haze value was measured by using a haze guard II manufactured by Toyo Seiki Seisaku-sho, Ltd., and measured according to ASTM D 1003.

Further, in order to the check the strength of the laminate D, a drop ball test was carried out. In the test, the laminate D was mounted on a test frame of JIS R 3205 (year 2005), and an iron ball having an weight of 4.11 kg was dropped from a height of 1.5 m to the center of the laminate D. The test was carried out in an atmosphere in which the room temperature was controlled to 23±2° C. As a result of the test, the iron ball did not penetrate through the laminate D.

Example 2

A transparent curable resin composition (it is referred to as composition Q) of UV curable type was produced by uniformly mixing 70 parts of the urethane acrylate oligomer (UF8001G manufactured by Kyoeisha Chemical Co., Ltd.) that is the same as one used for Example 1, 30 parts of a single-functional acrylate monomer (EBECRYL 112 manufactured by Daicel-Cytec Company Ltd.) and 1 part of benzoin isopropyl ether, and the composition was subjected to a bubble-removal treatment under a reduced pressure. The viscosity of the composition Q was measured at 40° C. in the same manner as Example 1, and as a result, it was 9.5 Pa·s. Here, from this result, it is apparent that the viscosity of the composition Q exceeds at least 0.5 Pa·s at 25° C. considering the temperature dependence of resin.

A laminate E was obtained in the same manner as Example 1 except that the composition Q was employed as the curable resin composition and it was sandwiched between a pair of glass substrates in the reduced pressure chamber maintained to be 30 Pa. The laminate E was irradiated with UV rays in the same manner as Example 1 to obtain a transparent laminate F having a structure of laminated glass.

The laminate F obtained contains no residual bubble defect observed, its haze value was about 1%, and it was good with high transparency. Further, using the laminate F, a ball drop test was carried out in the same manner as Example 1. As a result, an iron ball did not penetrate through the laminate.

Example 3

A pair of soda lime glass substrates having the same size and the same thickness as those of Example 1 were prepared, and a double sided adhesive tape of 1 mm thick and 10 mm wide, that is the same as one used in Example 1, was placed on each of four sides along the periphery of the substrates, in a state that a mold-release film of the double sided adhesive tape for one side is unremoved, and the pair of glass substrates were laminated.

Next, the double sided adhesive tape of one side on which the mold-release film remained was forcefully separated from one of the glass substrates by using a screw driver to have a clearance of about 2 mm, and from this clearance, it was attempted to inject 380 g of the composition P prepared in Example 1 in the same manner, but a bubble remained in a lower portion between the glass substrates and it was not possible to inject the composition P fully between the glass substrates.

INDUSTRIAL APPLICABILITY

The transparent laminate of the present invention constituted by two glass substrates and an interlayer made of a resin formed between the two substrates, provides high productivity and has excellent quality, it is suitable as a laminated glass for an window for buildings or vehicles.

The entire disclosure of Japanese Patent Application No. 2006-354969 filed on Dec. 28, 2006 including specification, claims, drawings and summary is incorporated herein by reference in its entirety.

What is claimed is:

1. A transparent laminate comprising
a pair of transparent substrates and a layer of a cured product of a curable resin composition sandwiched between the pair of transparent substrates,
wherein
the cured product of the curable resin composition is present in the entire gap formed by the pair of the transparent substrates and a continuous sealing portion provided along the periphery of the transparent substrates, and
the sealing portion is provided to seal the cured product of the curable resin composition and is transparent.

2. The transparent laminate according to claim 1, which satisfies formula (I):

$$T1 \times 0.05 \leq Ts \leq T2 \times 1.5 \qquad (I)$$

wherein
Ts represents a thickness of the cured product of the curable resin composition,
T1 represents a thickness of the thinnest transparent substrate, and
T2 represents a thickness of the other transparent substrate.

3. The transparent laminate according to claim 1, which has a haze value of at most 6%.

4. The transparent laminate according to claim 1, which satisfies formula (II):

$$0.9 \leq Is/Ir \leq 1.1 \qquad (II)$$

wherein
Is represents the transmittance of the sealing portion sandwiched between the pair of transparent substrates for light incident perpendicularly to the transparent substrates, and
Ir represents the transmittance of the layer of the cured product of the curable resin composition for light incident perpendicularly to the transparent substrates.

5. The transparent laminate according to claim 1, wherein the transparent substrates are each made of a glass or a resin.

6. The transparent laminate according to claim 1, wherein the pair of transparent substrates are curved substrates having approximately the same curvature.

7. The transparent laminate according to claim 1, wherein said curable resin composition comprises a curable oligomer having a molecular weight of at least 1,000 and a monomer dissolved therein.

8. The transparent laminate according to claim 1, wherein said curable resin composition comprises a curable oligomer having a molecular weight of at least 2,000 and a monomer dissolved therein.

9. The transparent laminate according to claim 1, wherein said curable resin composition comprises a UV-absorbing agent.

10. The transparent laminate according to claim 1, wherein said curable resin composition comprises a UV-absorbing agent selected from the group consisting of a benzotriazole compound, a benzophenone compound, and a salicylate compound.

11. A transparent laminate comprising
a pair of transparent substrates and a layer of a cured product of a curable resin composition sandwiched between the pair of transparent substrates,
wherein
the cured product of the curable resin composition is present in the entire gap formed by the pair of the transparent substrates and a continuous sealing portion provided along the periphery of the transparent substrates,
the sealing portion is provided to seal the cured product of the curable resin composition, and
said curable resin composition comprises a urethane acrylate oligomer having an urethane chain and at least two (meth)acryloyloxy groups.

12. A transparent laminate comprising
a pair of transparent substrates and a layer of a cured product of a curable resin composition sandwiched between the pair of transparent substrates,
wherein
the cured product of the curable resin composition is present in the entire gap formed by the pair of the transparent substrates and a continuous sealing portion provided along the periphery of the transparent substrates,
the sealing portion is provided to seal the cured product of the curable resin composition, and
said curable resin composition comprises a urethane acrylate oligomer having an urethane chain, a polyester chain, and at least two (meth)acryloyloxy groups.

13. A transparent laminate comprising
a pair of transparent substrates and a layer of a cured product of a curable resin composition sandwiched between the pair of transparent substrates,
wherein
the cured product of the curable resin composition is present in the entire gap formed by the pair of the transparent substrates and a continuous sealing portion provided along the periphery of the transparent substrates,
the sealing portion is provided to seal the cured product of the curable resin composition, and
said curable resin composition comprises a urethane acrylate oligomer having an urethane chain, a polyether chain, and at least two (meth)acryloyloxy groups.

14. The transparent laminate according to claim 1, wherein said curable resin composition comprises reacted units of a (meth)acrylate compound having a curable group selected from the group consisting of an acryloyloxy group and a methacryloyloxy group.

15. The transparent laminate according to claim 1, wherein said curable resin composition comprises reacted units of a (meth)acrylate compound having from 1 to 6 (meth)acryloyloxy groups per molecule.

16. The transparent laminate according to claim 1, wherein said curable resin composition comprises reacted units of a (meth)acrylate compound having a hydroxyl group in the compound.

17. A transparent laminate comprising
- a pair of transparent substrates and a layer of a cured product of a curable resin composition sandwiched between the pair of transparent substrates,
- wherein
- the cured product of the curable resin composition is present in the entire gap formed by the pair of the transparent substrates and a continuous sealing portion provided along the periphery of the transparent substrates,
- the sealing portion is provided to seal the cured product of the curable resin composition, and
- the sealing member comprises a double sided tape and a curable resin composition, in the cured form, present on an upper face of the double sided tape.

* * * * *